June 26, 1956　　　H. M. STUELAND　　　2,751,932
FLUID-PRESSURE CONTROL VALVE FOR MATERIAL LOADERS
Filed June 6, 1952　　　　　　　　　　　　　2 Sheets-Sheet 1

INVENTOR.
H. M. Stueland
Attorneys

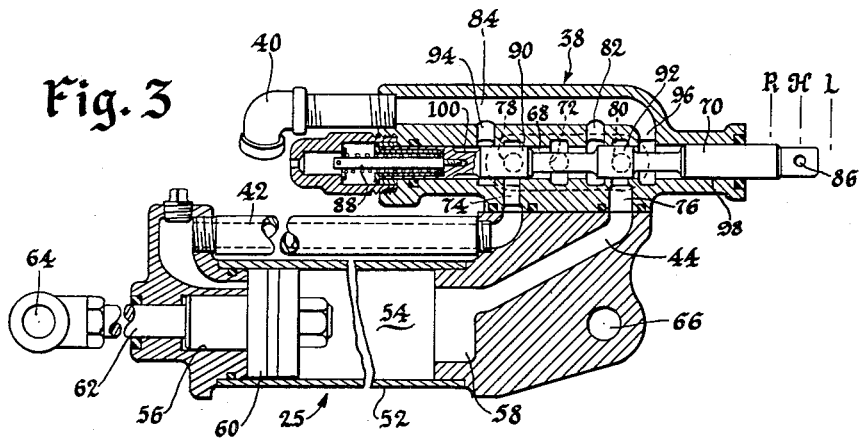
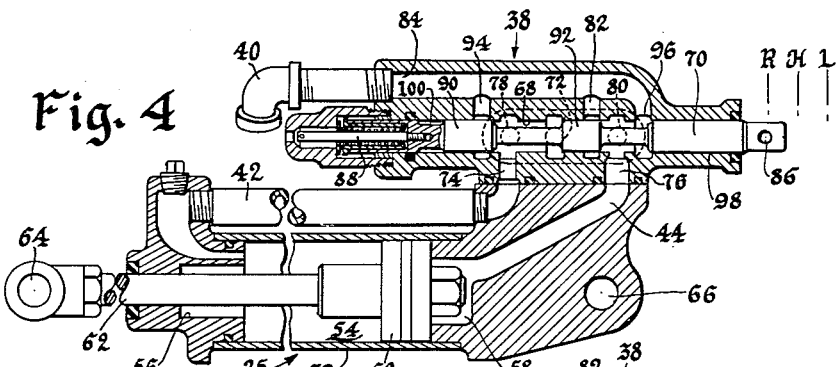
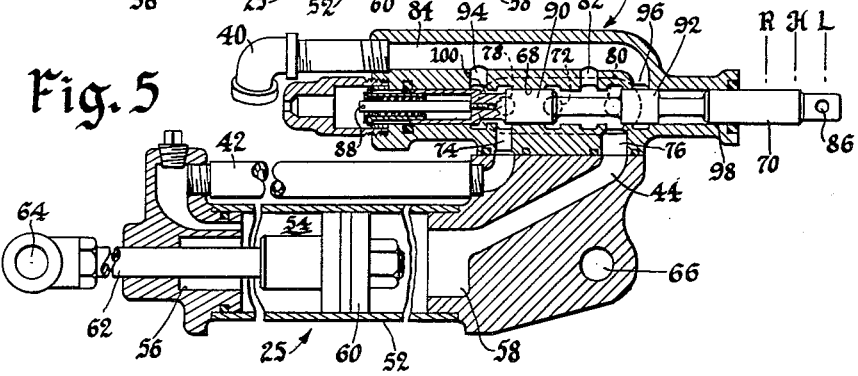
INVENTOR.
H. M. Stueland

United States Patent Office 2,751,932
Patented June 26, 1956

2,751,932

FLUID-PRESSURE CONTROL VALVE FOR MATERIAL LOADERS

Harold M. Stusland, East Moline, Ill., assignor to Deere & Company, Moline, Ill., a corporation of Illinois Application June 6, 1952, Serial No. 292,171

1 Claim. (Cl. 137—621)

This application is a continuation-in-part of copending application, Serial No. 218,105, filed March 29, 1951, now Patent No. 2,679,943 issued June 1, 1954, and the invention pertains to hydraulic control means for material handling apparatus such as typified by the well-known manure loader that is finding increased favor in the agricultural field.

A typical loader of the character referred to comprises a pair of lift arms or booms mounted at their rear ends on a transverse pivot axis to a rear part of the tractor so that the booms or arms extend forwardly to carry a scoop or bucket ahead of the tractor. Most agricultural tractors of recent make are either equipped or can be provided with hydraulic power means which furnishes an adequate source for raising and lowering the lift arms. Although a loader of this character is put to several uses, its primary purpose is the loading of manure or other material and accordingly the machine must be designed so that it can operate rapidly and efficiently. In the case of loading manure for example, the range of elevation is normally only between the ground and the top of the manure spreader body, in which case the bucket is operated through a sequence that includes loading, raising, dumping and lowering. A skillful operator can handle this job quite efficiently but there is still room for improvement. According to the present invention, a major improvement is made in the control by providing means whereby the bucket may be lowered more rapidly than has heretofore been possible. This result is accomplished by the provision of a hydraulic control in which fluid exhausted by the hydraulic cylinder or cylinders is short-circuited into the opposite end of the cylinder or cylinders so that it does not have to travel to the relatively remotely located reservoir. It will be appreciated that as the piston moves outwardly (or inwardly) in the cylinder, the chamber at the other end of the cylinder increases and provides an ideal reservoir. The normal one-way system or even the conventional two-way system does not operate in this fashion and, because of the many restrictions set up in the circuit, lowering or rapid movement in a certain direction is dependent upon the capacity of the fluid lines and reservoir to handle the returning fluid. Another feature of the present invention is that the valve has a pool chamber in which the pump outlet and the cylinder discharge are merged so that there is virtually no restriction to fluid exhaust. At the same time, the system operates conventionally in the raising cycle, so that the improved design is fundamentally adaptable to existing systems, as well as being capable of being designed basically into the original equipment.

These and other important objects and desirable features inherent in and encompassed by the invention will become apparent on the basis of the disclosure of a preferred embodiment of the invention as set forth in the following detailed description and accompanying sheets of drawings in which Figure 1 is a perspective view of a tractor-mounted loader.

Figure 3 is an enlarged fragmentary sectional view of the control valve and cylinder, with the valve in a neutral or "hold" position.

Figure 4 is a similar section view with the control valve in a "raise" position.

Figure 5 shows the control valve in a "lower" position.

Figure 1:
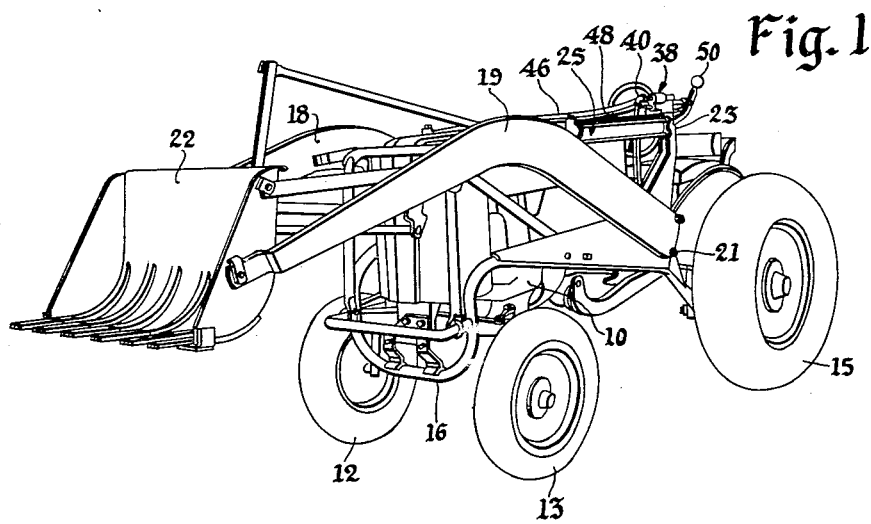

As will appear from the following description, the invention finds its greatest utility in material-handling apparatus such as typified by the tractor-mounted loader shown in Figure 1, primarily because of the increased efficiency afforded by the adaptation of the invention thereto. On the other hand, the invention is also useful in equivalent machines in which the same operational characteristics are present and in which the present improvements are desirable.

The tractor illustrated is of a well-known type comprising a longitudinal body 10 carried at its front end on right- and left-hand front wheels 12 and 13 and at its rear end on right- and left-hand traction wheels 14 and 15. The tractor body is equipped with an auxiliary or sub-frame 16 of the type disclosed in the copending application referred to above. Any other equivalent arrangement could be used. The sub-frame carries lift arm structure comprising right- and left-hand lift arms or booms 18 and 19 for raising and lowering movement about a transverse horizontal axis adjacent to the rear of the tractor, as indicated by the numeral 21 in Figure 1. The arms 18 and 19 carry at their forward ends a scoop or bucket 22, which likewise may be of any conventional construction.

The sub-frame 16 carries at each side of its rear end portion an upright support such as designated by the numeral 23 in Figure 1. The right-hand support does not appear in the drawings. A fluid motor, designated generally by the numeral 25, is connected at one end to the upper end of the support 23 and at its other end to an intermediate part of the lift arm 19. A similar fluid motor 24 (Figure 2) is arranged at the right-hand side of the tractor and is associated with the right-hand lift arm 18. Of course, the design could be such that only a single fluid motor could be used. Nevertheless, conventional designs virtually dictate the use of the two fluid motors and the present description will proceed on that basis.

Figure 2:
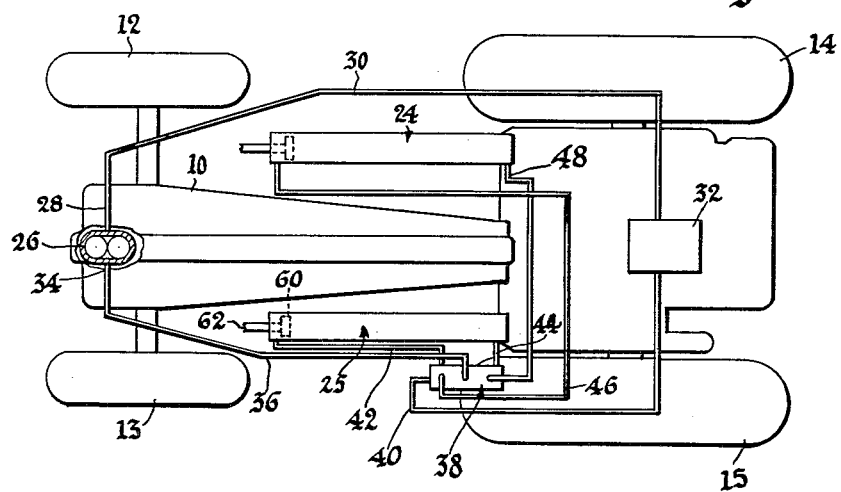
Figure 2 is a top plan view, largely schematic, showing the relationship of the hydraulic circuit to the tractor.

The fluid-pressure or hydraulic circuit is best illustrated in Figure 2. This circuit will be described generally before considering the details of some of its components.

The particular type of tractor illustrated is furnished with a fluid pump 26, located at the forward end of the tractor and preferably driven from the forward end of the engine cam shaft, which in itself is not an innovation. The pump has its inlet 28 connected by a fluid line 30 to a reservoir 32 and has its outlet 34 connected by a high-pressure line 36 to a control valve housing designated generally by the numeral 38.

The valve housing 38 has an exhaust line 40 leading to the reservoir 32 and in addition has what might be termed high- and low-pressure lines 42 and 44 connected respectively to the front and rear ends of the fluid motor 25. Similar and parallel connections 46 and 48 are made between the valve housing 38 and the front and rear ends of the right-hand fluid motor 24. Figure 1 shows a representative form of manual control lever 50 for operating the hydraulic system. Briefly, the arrangement is such that the control lever 50 has a central or neutral position in which the motors 24 and 25 are isolated from both the pump 26 and reservoir 32, and the pump circulates fluid through the system at no appreciable pressure. When the control lever is moved in one direction, fluid pressure is admitted simultaneously to the forward ends of the motors 24 and 25 for elevating the bucket or scoop 22 via the lift arm structure 18—19. The control lever 50 may be returned to its intermediate position, in which case the elevated position of the bucket will be maintained. When the control lever is moved in the opposite direction, fluid is exhausted from the motors 24 and 25 and the bucket is lowered.

The foregoing is only a brief and general description of the operation. The detailed operation will appear below in connection with the detailed description of the improved control valve and circuit arrangement.

Inasmuch as in the preferred embodiment of the invention the control valve housing 38 is mounted on or is a part of the left-hand fluid motor 25, that motor will be illustrated to the exclusion of the right-hand motor. However, the paralleling of the two motors will be readily appreciated.

The fluid motor 25 comprises a cylinder 52, the interior of which provides a fluid-receivable chamber 54 having a high-pressure end 56 and a low-pressure end 58. The cylinder 52 comprises a first motor member associated with a second motor member, here in the form of a piston 60 movable selectively back and forth in the cylinder or motor chamber 54 and having a piston rod 62 extending forwardly for connection to the left-hand lift arm 19. The piston rod is provided at its free end with a clevis 64 for attaching purposes. The cylinder has a rear bracket portion serving as a clevis 66 for attachment to the upper end of the left-hand upright support 23. Elevation of the bucket via the lifting arms 18 and 19 is preferably achieved by contraction of the motors 24 and 25, for in this design, bending stresses imposed on the piston rods are eliminated.

The valve housing 38 is of elongated construction and has therein an elongated generally cylindrical valve bore 68 in which is axially shiftably carried a control valve member 70. This member may be connected in any suitable manner to the control lever 50 described above. The discharge side 34 of the pump 26 is connected by the high-pressure line 36 to a pump port 72 that communicates with the valve bore 68. The pump port is located intermediate first and second motor ports 74 and 76. These are connected respectively by the fluid lines 42 and 44 to the high- and low-pressure ends 56 and 58 respectively of the motor chamber 54. It will be appreciated, of course, that there may be some difference in appearance between the connections in Figures 3, 4 and 5 and those in the schematic illustration as depicted in Figure 2, but it is thought that the passages and lines will be readily recognizable. Another pair of motor ports 78 and 80 lead to the front and rear ends of the right-hand motor 24 via the fluid lines 46 and 48.

When the control valve member 70 is in its neutral or hold position as shown in Figure 3, the pump port 72 is isolated from the motor ports 74 and 76 and communicates with the reservoir 32 via a reservoir port 82, a reservoir passage 84, and via the reservoir line 40. The reservoir 32 is also isolated from the motor ports and the motor 25 is hydraulically locked. The three positions of the control valve member 70 are designated by the letters R, H and L, which stand for "raise," "hold" and "lower." The outer end of the control valve member 70 has an aperture 86 therein for effecting a suitable connection to the control lever 50. In the various figures (Figures 3, 4 and 5), the position of the aperture 86 relative to the letters R, H and L indicates the position of the control valve in the valve bore 68.

The central or hold position of the control valve member 70 is maintained by a centering spring device 88. The particular design illustrated may, of course, be departed from and the principles of the invention will still be attainable.

When the control valve member 70 is shifted to the left (Figure 4) into its raise position, the pump port 72 is connected via the valve bore 68 to the high-pressure motor port 74, which leads to the chamber end 56. Consequently, the piston 60 moves rearwardly in the chamber 54 to elevate the lift arm 19. Since the motors 24 and 25 operate simultaneously, the entire lift arm structure 18—19 is raised. The valve member 70 has a cylindrical land 90 which cuts off the pump port 72 from the motor port 74 when the valve member 70 is in its hold position as shown in Figure 3. The valve member has a second land 92 which cuts off the pump port 72 from the other motor port 76.

In the hold position of the control valve member 70, the lands 90 and 92 cut off the motor ports 74 and 76 from the reservoir port 82 and also from additional reservoir ports 94 and 96. The valve member is, of course, reduced between the lands 90 and 92 and is also reduced between the land 92 and a cylindrical bearing portion 98 adjacent to the rear or right-hand end of the valve member.

When the valve member is shifted to its raise position as shown in Figure 4, the land 90 cuts off the pump and motor ports 72 and 74 from the reservoir port 94 and the land 92 cuts off the motor port 74 and pump port 72 from the reservoir port 82. The reduced portion of the valve between the land 92 and the bearing portion 98 effects a communication via the valve bore 68 between the low-pressure motor port 76 and the reservoir port 96. Thus, fluid under pressure is admitted to the high-pressure end 56 of the motor chamber 54 and fluid is exhausted via the passage 44 from the low-pressure end 58 of the motor chamber to the reservoir 32. Shifting of the valve to the left for its raise position is against one part of the two-way spring action of the centering device 88, so that upon release of manual pressure against the control lever 50, the centering device will return the valve to the neutral or hold position of Figure 3, again hydraulically locking the motor so that the elevated position of the lift arm structure and bucket will be maintained.

The bucket may be lowered by shifting the control valve member 70 to the lower position of Figure 5, which action is against the other part of the two-way spring action of the centering device 88, so that upon release of the control lever 50, the valve 70 will be returned to the neutral or hold position of Figure 3. In its lower position, the valve member 70 connects both the pump outlet and the high-pressure end of the motor chamber 54 to both the low-pressure end 58 of the motor chamber and the reservoir 32. Consequently, the chamber 54 serves as a supplemental reservoir and exhaust from the chamber end 56 is materially accelerated. This desirable result is accomplished as set forth below.

As shown in Figure 5, the land 90 on the control valve member 70 serves as an auxiliary valve to uncover both the pump port 72 and the first or high-pressure motor port 74. Although the land is here shown as an integral part of the valve member 70, the two could be mechanically or otherwise connected and even separately housed. The land 92 uncovers the reservoir port 82 and also uncovers the low-pressure motor port 76. The pump port 72 is thus communicated via the valve bore 78 and the reduced portion of the valve member 70 between the lands 90 and 92 with both the reservoir port 82 and the motor port 76. At the same time, the other motor port 74 is communicated via the valve bore 68 and a reduced intermediate portion 100 of the valve member 70 with the reservoir port 94. Since the reservoir port 94 communicates with the reservoir passage 84, which in turn communicates through the reservoir port 82 with the low-pressure motor port 76, the motor ports 74 and 76 are interconnected. It will be seen that the reservoir passage 84 and the portion of the valve bore 68 between the lands 90 and 92 serve as a pool chamber in which the pump discharge and the exhaust from the motor port 74 merge to flow to the reservoir, which now is not only the reservoir 32 but includes the supplemental reservoir afforded by the low-pressure end 58 of the motor chamber 54. It will be appreciated that the elevated bucket and lift arm structure is of considerable weight, so that when the control valve member 70 is moved to its lower position the velocity of the returning fluid is relatively high. Because of the restrictions that normally occur in fluid lines and because of the relatively remote location of the reservoir 32 as dictated by tractor designs, rapid lowering of the bucket and lift arm structure was heretofore achievable only at the expense of high-line pressures, frothing of the oil and discharging of the oil through the conventional reservoir vents. According to the present invention, these difficulties are avoided, since the returning fluid or oil will naturally take the path of least resistance and will flow into the low-pressure end of the motor chamber 54, which result is even more readily achievable because of the extreme low pressure created at that end by the rapid movement of the piston 60 in the opposite direction. That is to say, the chamber end 58 is continually being enlarged as the piston 60 moves to the left as the bucket and lift arm structure lowers. Elimination of frothing in the oil is of considerable importance, since the normal working temperature of the oil may be maintained at a markedly lower degree and at the same time there is avoided the accumulation of air bubbles in the fluid. All of this means that the entire system may be more economically constructed, since special components, such as heat-resisting seals, for example, need not be incorporated in the system to accommodate overheating of the fluid, etc.

It will be seen from the foregoing description that the fluid-transfer and -control means provided by the valve 38 for fluid-connecting the pump-discharge outlet and the motors and reservoir has the selectively positionable valve 70 movable into the neutral position of Figure 3 or either of the active positions of Figures 4 and 5 and that in the active position of Figure 5 (the lower position) both the pump outlet and the high-pressure end of the motor chamber 54 are connected in common to both the reservoir 32 and the reservoir afforded by the low-pressure end 58 of the motor chamber 54 so that the fluid motors may be de-energized to effect rapid lowering of the lift arm and bucket structure.

Various other features of the invention not specifically enumerated herein will undoubtedly occur to those versed in the art, as will modifications in the preferred design disclosed, all of which may be achieved without departing from the spirit and scope of the invention.

What is claimed is:

A control valve of the character described for use with a fluid motor providing a fluid-receivable chamber having opposite high- and low-pressure ends, comprising: a valve housing including a valve bore having opposite ends; a three-position cylindrical valve member axially shiftable in the valve bore among "neutral," "raise" and "lower" positions; said housing having a supply port intermediate the ends of and opening into the valve bore, first and second motor ports spaced axially at opposite sides respectively of the supply port, first and second exhaust ports opening freely into the valve bore respectively axially beyond the motor ports, and an intermediate exhaust port opening freely into the valve bore axially intermediate the supply port and the second motor port, and chamber means freely interconnecting all the exhaust ports outside the valve bore; said valve member having first and second lands axially separated by a central groove, and first and second end grooves respectively axially beyond the lands; said lands and grooves being so arranged relative to the ports that in the neutral position of the valve member the first and second lands respectively block the motor ports and the central groove connects the supply port with the intermediate exhaust port, in the raise position of the valve member the central groove connects the supply port with the first motor port while the first and second lands respectively block the first and intermediate exhaust ports and the second groove connects the second motor port and the second exhaust port, and in the lower position of the valve member only the second exhaust port is blocked by the second land but the first groove freely connects the first motor port and the first exhaust port and the central groove freely connects both the supply port and the second motor port to each other and to the intermediate exhaust port.

References Cited in the file of this patent
UNITED STATES PATENTS

| | | |
|---|---|---|
| 2,215,115 | Buffington | Sept. 17, 1940 |
| 2,293,906 | Kvavle et al. | Aug. 25, 1942 |
| 2,341,151 | Maloon | Feb. 8, 1944 |
| 2,543,989 | Rockwell | Mar. 6, 1951 |
| 2,572,705 | Edman | Oct. 23, 1951 |
| 2,577,999 | Christensen | Dec. 11, 1951 |
| 2,581,430 | Mork et al. | Jan. 8, 1952 |